United States Patent
Thum

(10) Patent No.: US 12,280,831 B2
(45) Date of Patent: Apr. 22, 2025

(54) REAR PORTION OF A BODY OF A MOTOR VEHICLE

(71) Applicant: Dr. Ing. h.c. F. Porsche Aktiengesellschaft, Stuttgart (DE)

(72) Inventor: Dominik Thum, Pforzheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 302 days.

(21) Appl. No.: 18/087,193

(22) Filed: Dec. 22, 2022

(65) Prior Publication Data
US 2023/0249753 A1    Aug. 10, 2023

(30) Foreign Application Priority Data
Feb. 9, 2022    (DE) .................... 10 2022 103 031.8

(51) Int. Cl.
*B62D 25/08*    (2006.01)
*B62D 27/04*    (2006.01)
*B62D 29/00*    (2006.01)

(52) U.S. Cl.
CPC ............. *B62D 25/08* (2013.01); *B62D 27/04* (2013.01); *B62D 29/002* (2013.01)

(58) Field of Classification Search
CPC ...... B62D 25/08; B62D 27/04; B62D 29/002; B62D 35/02; B62D 35/007
See application file for complete search history.

(56) References Cited

U.S. PATENT DOCUMENTS

| | | | | |
|---|---|---|---|---|
| 8,726,424 B2 * | 5/2014 | Thomas | .................. | F16F 7/121 |
| | | | | 2/414 |
| D1,034,375 S * | 7/2024 | Huang | .......................... | D12/196 |

FOREIGN PATENT DOCUMENTS

| | | | | |
|---|---|---|---|---|
| DE | 10260531 A1 | 7/2004 | | |
| DE | 102005011309 B3 | 10/2006 | | |
| DE | 102009034761 A1 * | 2/2010 | ............. | B60R 19/24 |
| DE | 102008045896 A1 | 4/2010 | | |
| DE | 102011102648 A1 * | 11/2012 | ............. | B62D 21/15 |
| DE | 102012109835 A1 | 4/2014 | | |
| WO | WO-2016148635 A1 * | 9/2016 | ............. | B60R 19/18 |

* cited by examiner

*Primary Examiner* — Lori Lyjak
(74) *Attorney, Agent, or Firm* — Buchanan Ingersoll & Rooney PC

(57) ABSTRACT

A rear portion of a body of a motor vehicle includes a shell, which at least partially delimits the rear portion from an environment with the aid of a panel element. For absorbing compressive forces (DK) and tensile forces (ZK) acting on the rear portion, the rear portion includes a first support element and a second support element, wherein the first support element is designed to absorb the compressive forces (DK) and the second support element is designed to absorb the tensile forces (ZK).

12 Claims, 4 Drawing Sheets

REAR PORTION OF A BODY OF A MOTOR VEHICLE

CROSS-REFERENCE TO RELATED APPLICATION

Figure 1:
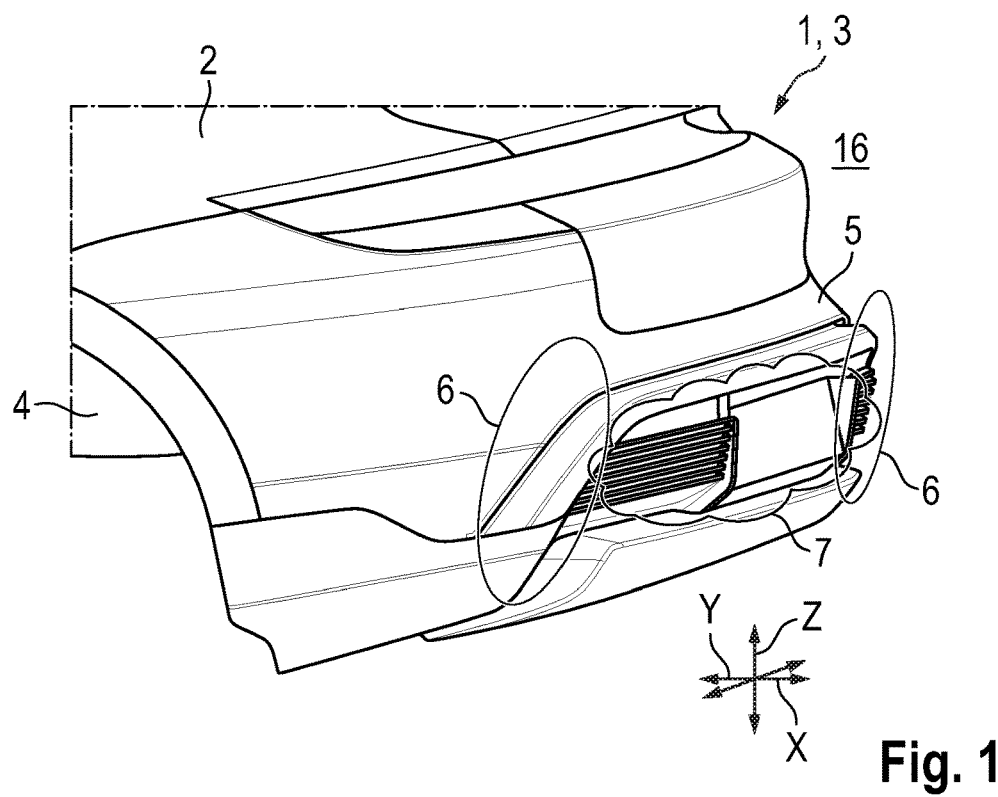

This application claims priority to German Patent Application No. 10 2022 103 031.8, filed Feb. 9, 2022, the content of such application being incorporated by reference herein in its entirety.

FIELD OF THE INVENTION

The invention relates to a rear portion of a body of a motor vehicle.

BACKGROUND OF THE INVENTION

Rear portions of bodies of motor vehicles are known. The rear portion of the body is formed as a body portion which terminates the body and which typically has flow separations or at which flow separations occurs. The flow separations may result in large pressure fluctuations behind the motor vehicle. Furthermore, superimposition of these pressure fluctuations, which may also be referred to as aerodynamic excitations, with roadway and/or powertrain excitations, in particular engine-induced excitations, may also result in high forces on the rear portion. The excitation causes forces on a rear panel of the rear portion, which forces may bring about a vibrating motion in the form of flapping of the rear panel.

One solution for avoiding this possible flapping is a stiff design of the rear portion, wherein a stiff design typically contradicts a preferred lightweight construction of the body since the former is preferably designed in a solid construction of the rear portion. Furthermore, various crash requirements contradict an extremely stiff rear portion since further parts, in particular of the body, could be damaged upon impact on and/or next to the rear portion, which can result in high repair costs.

DE 10 2005 011 309 B3, which is incorporated herein by reference, discloses a panel element of a motor vehicle, wherein the panel element is fastened to a body of the motor vehicle via a retaining element in the form of a cable, wherein the retaining element can absorb tensile forces only in one direction.

A device for supporting a body component of a motor vehicle and an adjacent mounting part with the aid of a mounting foam can be taken from DE 102 60 531 B4, which is incorporated herein by reference.

SUMMARY OF THE INVENTION

Described herein is a rear portion of a body of a motor vehicle that has a secure connection of a panel element to the body, which panel element is connected to the body in a vibration-free or at least low-vibration manner.

A rear portion according to aspects of the invention of a body of a motor vehicle, wherein the body comprises a shell, is at least partially delimited from an environment with the aid of a panel element. According to aspects of the invention, for absorbing compressive forces and tensile forces acting on the rear portion, the rear portion comprises a first support element and a second support element, wherein the first support element is designed to absorb the compressive forces and the second support element is designed to absorb the tensile forces. The advantage of the invention can be seen in that the compressive forces and tensile forces acting on the rear portion are not diverted by a global stiffening measure, e.g., thick-walled body parts, but by components that, as a result of the separate absorption of tensile forces and compressive forces at different absorption points, can be precisely designed in a possible conflict of goals from crash and aerodynamic requirements. A further advantage can be seen in that the support elements may have different geometries and can thus be designed to be small and optimized in terms of installation space according to their functions. Likewise, they may be formed from different materials so that small and lightweight support elements can be realized overall.

In order to effectively introduce the compressive forces and the tensile forces, the first support element and the second support element are in particular directly, at least indirectly, supported on the panel element.

Advantageously, the first support element has a set failure.

Advantageously, the first support element is formed from a plastic in order to realize a lightweight design, wherein it is particularly advantageously produced from a foam characterized by ease of assembly, in order to effect inexpensive production of the rear portion. The foam is attached between the panel element and a corresponding component arranged opposite the panel element, e.g., a beam formed between the shell and the panel element. During assembly, this foam is compressed and thereby exerts a constant force in the direction of a longitudinal body axis on the panel element, thereby counteracting vibration excitation in the direction of the component opposite the panel element.

In order to reliably absorb the tensile forces, the second support element is designed in the form of a high-tensile-strength, low-compressive-strength component, wherein it is arranged between the panel element and the shell. It may in particular be designed in the form of a cable, e.g., a steel cable, a belt or a plastic tab.

The fastening of the second support element to the shell is further advantageous. The attachment of the second support element to the shell has the advantage of a shorter tolerance chain compared to an attachment to a mounting part, e.g., a so-called crash management system or a cross beam. The second support element can be installed in a process-reliable manner without any adjustment measures. In principle, the attachment of the second support element to the shell is characterized by a simple assembly.

Of course, the second support element could in principle also be connected to the crash management system, but the second support element must still be adjusted accordingly after its assembly in order to effect reliable functioning of the second support element. This is because when attached to the crash management system, functioning is not given due to tolerances and a low amplitude of vibrations caused. For example, in the form of a cable, in particular a steel cable, the cable would sag loosely in the case of unfavorable tolerances and is not completely stretched even with strong excitation, so that it would not be effective. In the case of unfavorable tolerances in the other direction, the steel cable would pull and deform the panel element in the direction of a body interior of the body, which would result in an unattractive indentation of the panel element. However, the adjustment work results in an increase in production duration and thus in an increase in production costs of the motor vehicle.

In a further embodiment of the rear portion according to aspects of the invention, the first support element is connected to a crash management system, which is designed to intentionally fail in the event of an accident. A stable connection of the first support element, which is designed to divert the compressive forces, to the shell has proven to be unsuitable since in the event of an accident, also referred to as a crash, high forces would be introduced into the shell, which can result in damage to the shell. Damage to the shell is complex to repair and can only be repaired with difficulty, in particular at high costs. In other words, the connection of the first support element to the crash management system would result in a good introduction of the compressive forces into the first support element and, in the event of corresponding damage, in inexpensive repair.

In order to realize an optimized installation space requirement, the first support element and the second support element are designed in the form of an integral component. It should be noted that in this context, the first support element and the second support element are not produced integrally and from a single material but are each made from a material corresponding to their function and are preferably not joined until after their production.

BRIEF DESCRIPTION OF THE DRAWING FIGURES

Figure 2:
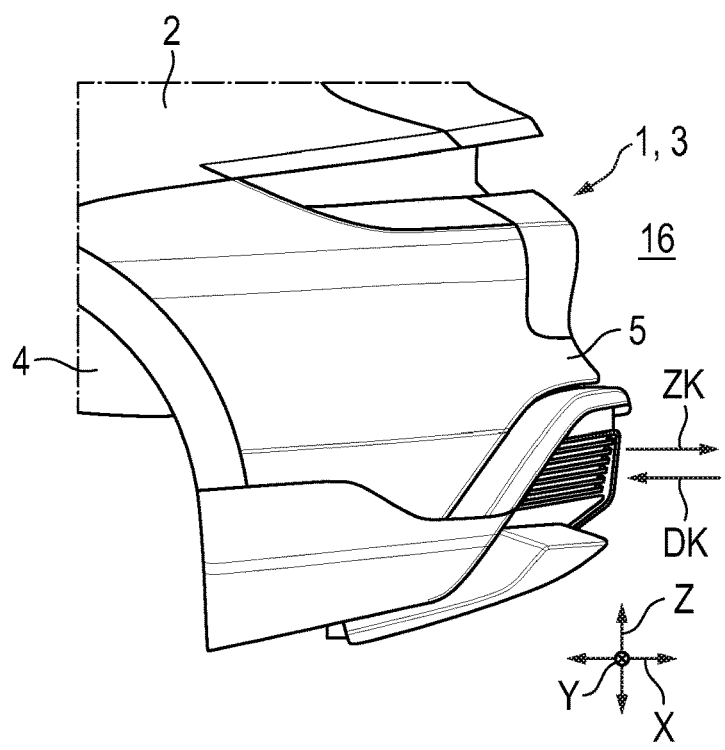
Figure 3:
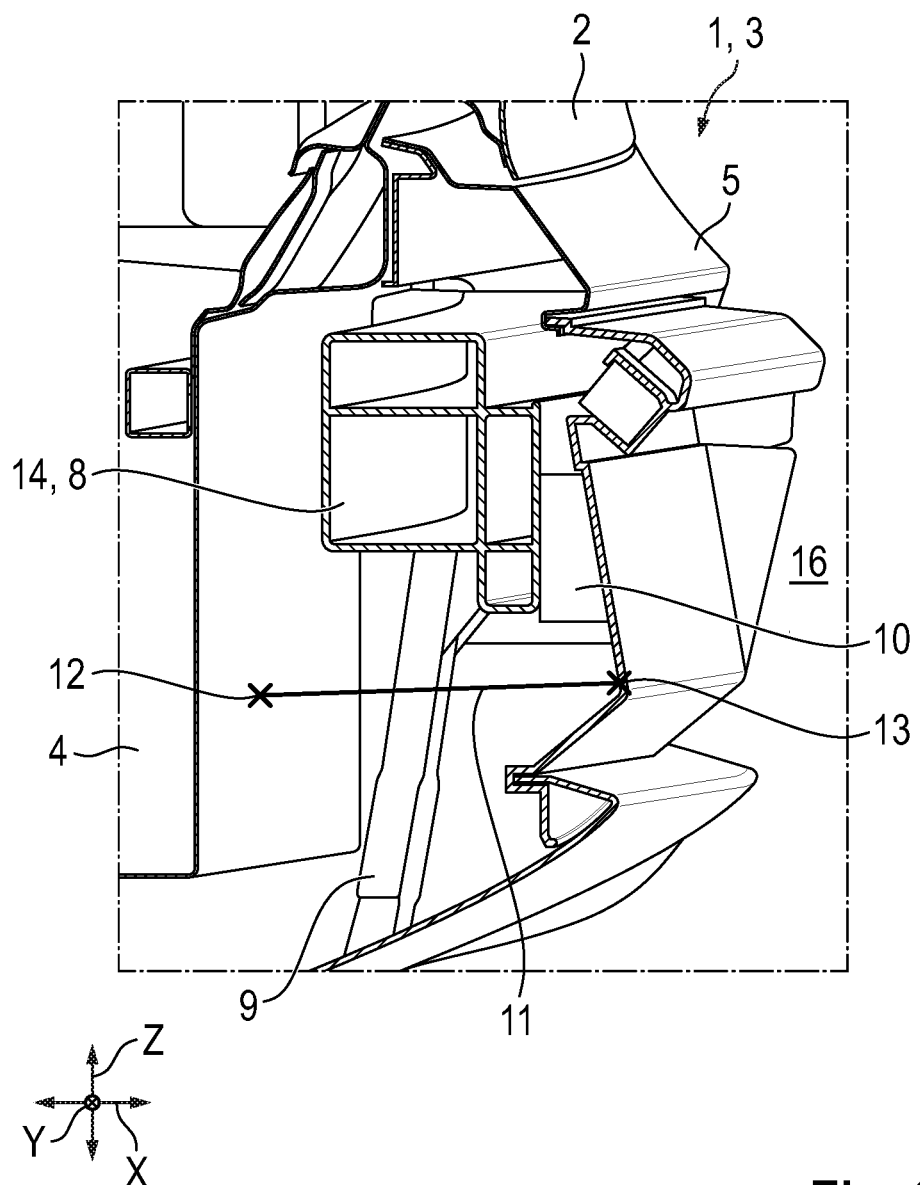
Figure 4:
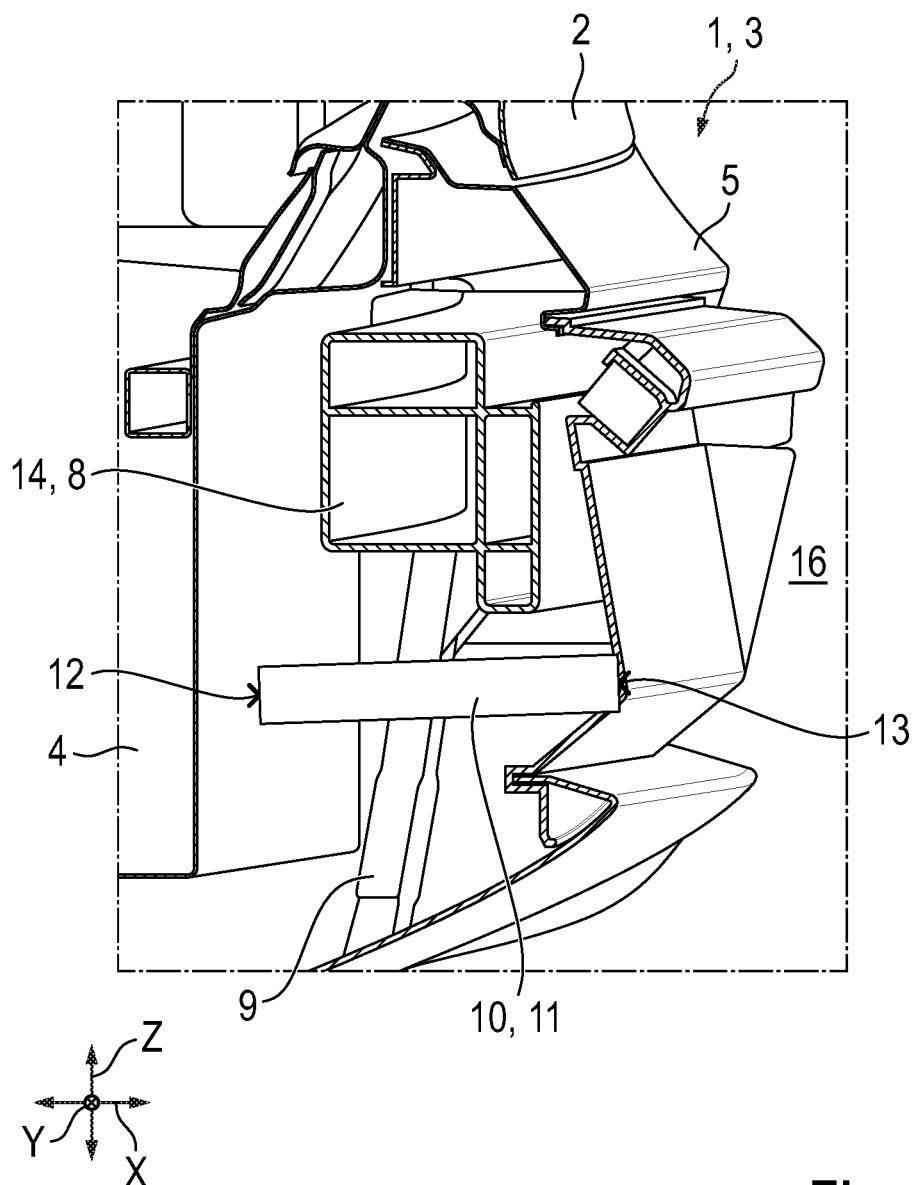
Figure 5:
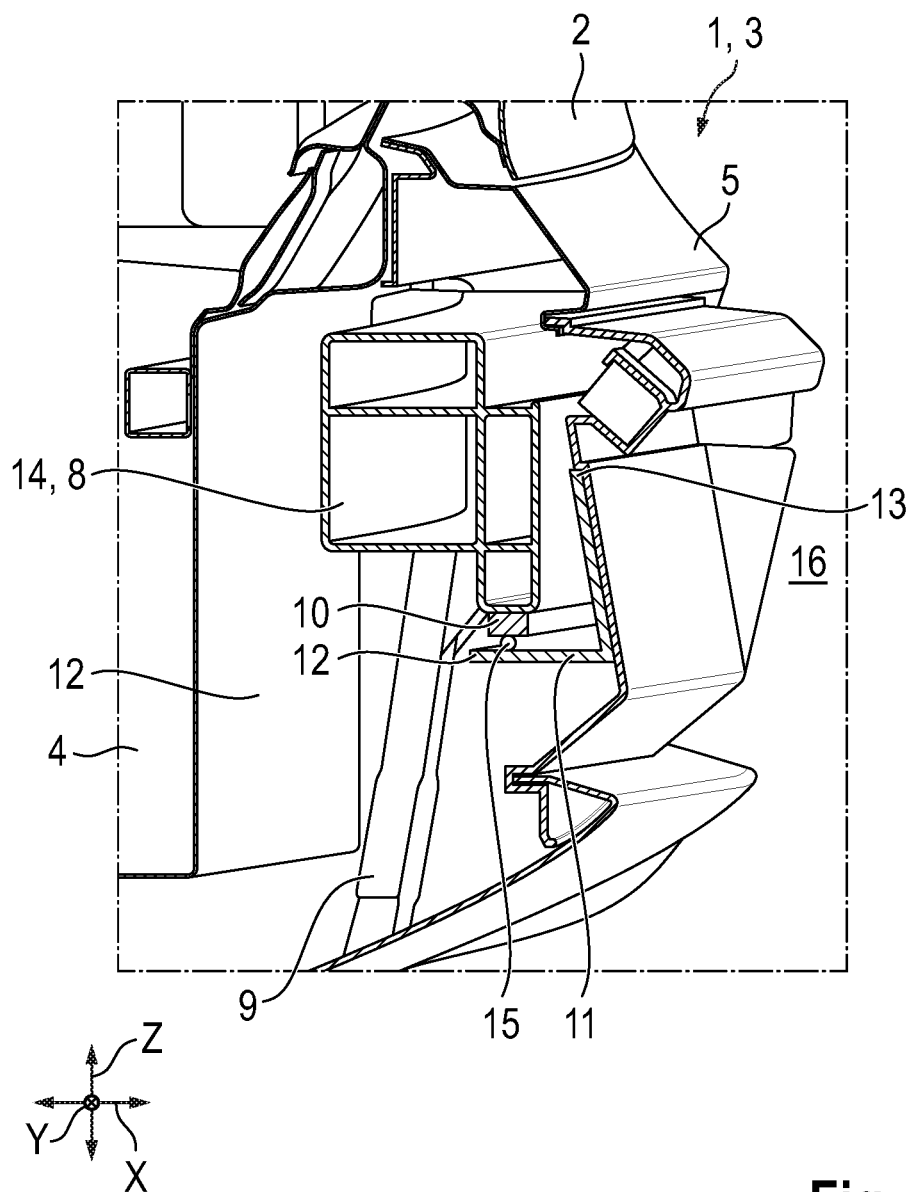

Additional advantages, features and details of the invention arise from the following description of preferred exemplary embodiments and with reference to the drawing. The features and combinations of features mentioned above in the description and the features and combinations of features mentioned below in the description of the figures and/or shown alone in the figures can be used not only in the respectively indicated combination but also in other combinations or on their own without departing from the scope of the invention. The figures show:

FIG. 1 a perspective view of a rear portion according to aspects of the invention of a body of a motor vehicle in a first exemplary embodiment, FIG. 2 a side view of the rear portion according to FIG. 1, FIG. 3 a partial section of the rear portion according to FIG. 1, FIG. 4 a partial section of the rear portion in a second exemplary embodiment, and FIG. 5 a partial section of the rear portion in a third exemplary embodiment.

DETAILED DESCRIPTION OF THE INVENTION

FIGS. 1 and 2 illustrate a perspective view and a side view, respectively, of a rear portion 1 according to aspects of the invention of a body 2 of a motor vehicle 3, wherein a panel element 5 is provided to cover a shell 4 of the body 2 toward an environment 16. The panel element 5 is thus designed to delimit the rear portion 1 from the environment 16.

The panel element 5 is designed as a flow directing element via which air flowing along the body 2 flows. In this case, flow separations occur in the areas 6 of the rear portion 1 and can cause turbulent flow with high pressure fluctuations at one end 7 of the body 2. This produces forces acting on the panel element 5, wherein the panel element 5 is in particular excited to perform vibrations, which can also be referred to as flapping. The acting forces are divided into compressive forces DK and tensile forces ZK.

The panel element 5 covers a beam 8 as well as a beam support 9 for supporting the beam 8, as illustrated in detail in FIG. 3. High forces are exerted on the panel element 5 in the operation of the motor vehicle 3 and are at least absorbed to the greatest possible extent, and thus eliminated, with the aid of a first support element 10 for absorbing the compressive forces DK and of a second support element 11 for absorbing the tensile forces ZK.

The rear portion 1 depicted in a longitudinal section according to the first exemplary embodiment in FIG. 3 comprises the first support element 10 arranged between the panel element 5 and the beam 8. When viewed in the direction of a longitudinal body axis X of the body 2, the first support element 10 is arranged between the beam 8 and the panel element 5, or in other words, when viewed in the direction of the longitudinal body axis X, starting from the end 7 in the direction of front of the body 2 facing away from the rear portion 1 and not shown in more detail, the first support element 10 is accommodated after the panel element 5 and before the beam 8 between the two components 5, 8.

The first support element 10 has a set failure. In other words, it fails from a specific, defined compressive force DK. Or in other words, the compressive force DK leading to failure is preset, and from this compressive force DK, the first support element 10 has a defect, e.g., as a result of breaking, cracking, or something else. If the first support element 10 is formed from a metallic material, e.g., aluminum or steel, it has a so-called "predetermined breaking point" or a so-called "predetermined bending point."

In order to avoid high repair costs, the first support element 10 is arranged, for introducing the compressive forces DK, on a so-called crash management system 14, which is specifically designed for damage in the event of an accident. In other words, this crash management system 14 is designed in the sense of a predetermined damage point of the motor vehicle 3. The beam 8 is designed in the present exemplary embodiments as a part of the crash management system 14.

In order to realize a lightweight design, the first support element 10 is produced from a plastic, in particular from a foam. During assembly, this foam is compressed and thereby exerts a constant force in the direction of the longitudinal body axis X, starting from the front of the body 2 in the direction of the rear portion 1, on the panel element 5. Oppositely directed forces DK, i.e., forces acting from the rear portion 1 in the direction of the front, are thus reduced or eliminated. Depending on a tolerance position, a compressive force DK inherent in the first support element 10 due to the compression can vary in a small range so that a range of force, and thus the failure, can be adjusted easily and reliably in a typical compression.

Preferably, the first support element 10 is connected to the panel element 5 in a form-fitting manner so that, preferably prior to assembly of the panel element 5, which is designed by way of example in the form of a bumper, on the body 2, the support element 10 can be fastened to the panel element 5. This can be realized at low cost in the form of a double-sided adhesive foil, for example.

The second support element 11 serves to absorb the tensile forces ZK. For this purpose, it is designed in the form of a high-tensile-strength and low-compressive-strength component. Preferably, it is designed in cable form, for example as a steel cable or as a belt, or in the form of a plastic tab. In other words, it may be formed from a metallic material or from a plastic or in the form of a composite.

For example, if the forces acting from the first support element 10 on the panel element 5 along the longitudinal body axis X are potentially too high, at least the too high portion of the forces of the first support element 10 could be absorbed by the second support element 11. The panel element 5 would then be "clamped" with respect to forces acting from the support elements 10, 11.

At this point, it is mentioned that both support elements 10, 11 are arranged behind the panel element 5 in a manner invisible from the environment 16.

The rear portion 1 according to aspects of the invention of the first exemplary embodiment comprises the two support elements 10, 11 arranged separately from one another in the body 3. The second support element 11 is provided for absorbing the tensile forces ZK between the shell 4 and the panel element 5, wherein it is arranged and extends substantially along the longitudinal body axis X. With its first element end 12, it is accommodated on and fastened to the shell 4 and with its second element end 13 facing away from the first element end 12, it is accommodated on and fastened to the panel element 5. Preferably, the second support element 11 is accommodated with the aid of a bolt fastened to the shell 4, in particular a welded stud.

In a second exemplary embodiment of the rear portion 1 according to aspects of the invention, which is designed according to FIG. 4, the first support element 10 and the second support element 11 are designed as an integral component. For example, the first support element 10 may at least partially comprise the second support element 11, as depicted in FIG. 4. The second support element 12 is fastened to the shell 4 and to the panel element 5 and comprises the first support element 10, which is thus likewise arranged between the shell 4 and the panel element 5.

In this design of the first support element 10 and the second support element 11, the two support elements 10, 11 have independent functions. This may be realized, for example, in that the first support element 10 produced from the foam has a cavity which is formed along its longitudinal extension and in which the second support element 11 is accommodated.

The integral component could also be formed from a material, for example a plastic, that integrates the function of the first support element 10, the absorption of the compressive forces DK, and the function of the second support element 11, the absorption of the tensile forces ZK. The integral component could also have a shape designed to absorb the compressive forces DK and to absorb the tensile forces ZK. Or the integral component could be designed in a combination of the corresponding material and a corresponding shape for absorbing the compressive forces DK and for absorbing the tensile forces ZK.

In a third exemplary embodiment, which is depicted in FIG. 5, the rear portion 1 according to aspects of the invention comprises both the first support element 10 and the second support element 11 to absorb the compressive forces DK and the tensile forces ZK, respectively, on the beam 8. The first support element 10 is arranged on the beam 8 and operatively connected to the second support element 11 at the first element end 12 thereof with the help of an adjustment element 15 formed between the first support element 10 and the second support element 11, wherein the second support element 11 is operatively connected at its second element end 13 to the panel element 5. The adjustment element 15 is required for adjusting the failure and should be designed to adjust in the direction of the longitudinal body axis X as well as in the direction of a transverse body axis Y of the body 2 and a vertical body axis Z of the body 2, the three body axes X, Y, Z being orthogonal to one another.

The adjustment element 15 would be used in particular in the design of the first support element 10 in the form of an inelastic component made of plastic, aluminum, steel, or other materials since due to the high tolerances, an adjustment in the direction of all three body axes X, Y, Z is to be made in this case during the assembly of the first support element 10.

In an exemplary embodiment not shown in greater detail, the second support element 11 depicted in FIG. 5 is designed in the form of the integral component, wherein, since the integral component has the function of the first support element 10 and of the second support element 11, the first support element 10 depicted in FIG. 5 is thus omitted and the adjustment element 15 is accommodated directly on the beam 8.

LIST OF REFERENCE SIGNS

1 Rear portion
2 Body
3 Motor vehicle
4 Shell
5 Panel element
6 Area
7 End
8 Beam
9 Beam support
10 First support element
11 Second support element
12 First element end
13 Second element end
14 Crash management system
15 Adjustment element
16 Environment
DK Compressive forces
X Longitudinal body axis
Y Transverse body axis
Z Vertical body axis
ZK Tensile forces

What is claimed is:

1. A rear portion of a body of a motor vehicle, said rear portion comprising:
   a shell;
   a panel element mounted either directly or indirectly to the shell, the panel element delimiting the rear portion and being positionable to face an exterior environment;
   a first support element configured to absorb compressive forces (DK) acting on the rear portion; and
   a second support element configured to absorb tensile forces (ZK) acting on the rear portion.

2. The rear portion according to claim 1, wherein the first support element and the second support element are supported at least indirectly on the panel element.

3. The rear portion according to claim 1, wherein the first support element has a predetermined failure point.

4. The rear portion according to claim 1, wherein the first support element is formed from a plastic.

5. The rear portion according to claim 4, wherein the first support element is produced from a foam.

6. The rear portion according to claim 1, wherein the second support element is a high-tensile-strength, low-compressive-strength component.

7. The rear portion according to claim 1, wherein the second support element is a steel cable or a belt or a plastic tab.

8. The rear portion according to claim 1, wherein the second support element is fastened to the shell.

9. The rear portion according to claim 1, wherein the first support element is connected to a crash management system.

10. The rear portion according to claim 1, wherein the first support element and the second support element are integrated in a single component.

11. The rear portion according to claim 1, wherein an adjustment element is formed between the first support element and the second support element.

12. A motor vehicle comprising the rear portion of claim 1.

* * * * *